US012559971B2

(12) United States Patent
Hezel et al.

(10) Patent No.: US 12,559,971 B2
(45) Date of Patent: Feb. 24, 2026

(54) CLOSURE DEVICE FOR ATTACHING TO A ROBOT

(71) Applicant: Dürr Systems AG, Bietigheim-Bissingen (DE)

(72) Inventors: Thomas Hezel, Asperg (DE); Jürgen Haas, Knittlingen (DE)

( * ) Notice: Subject to any disclaimer, the term of this patent is extended or adjusted under 35 U.S.C. 154(b) by 1490 days.

(21) Appl. No.: 16/464,320

(22) PCT Filed: Dec. 1, 2017

(86) PCT No.: PCT/EP2017/081130
§ 371 (c)(1),
(2) Date: May 28, 2019

(87) PCT Pub. No.: WO2018/104161
PCT Pub. Date: Jun. 14, 2018

(65) Prior Publication Data
US 2020/0347868 A1 Nov. 5, 2020

(30) Foreign Application Priority Data
Dec. 9, 2016 (DE) ..................... 10 2016 014 660.5

(51) Int. Cl.
*E05B 17/20* (2006.01)
*B25J 11/00* (2006.01)
(Continued)

(52) U.S. Cl.
CPC ....... *E05B 17/2046* (2013.01); *B25J 11/0075* (2013.01); *B25J 19/0075* (2013.01);
(Continued)

(58) Field of Classification Search
CPC ......... Y10T 292/1099; Y10T 292/1039; Y10T 292/0863; Y10T 292/0864;
(Continued)

(56) References Cited

U.S. PATENT DOCUMENTS

| | | | | | |
|---|---|---|---|---|---|
| 2,315,335 A | * | 3/1943 | Kane | .......................... | F16B 5/10 411/552 |
| 2,368,713 A | * | 2/1945 | Kane | .......................... | F16B 5/10 411/552 |

(Continued)

FOREIGN PATENT DOCUMENTS

| | | | | |
|---|---|---|---|---|
| AT | 241574 B | * | 11/1963 | .............. F16B 21/04 |
| CN | 202118044 U | | 1/2012 | |

(Continued)

OTHER PUBLICATIONS

Chinese Office Action for Application No. CN201780075773.8 mailed Mar. 9, 2021 (10 pages; with English translation of search report).

(Continued)

*Primary Examiner* — Steven A Tullia
(74) *Attorney, Agent, or Firm* — Taft Stettinius & Hollister LLP; Thomas E. Bejin; John W. Carpenter

(57) ABSTRACT

The disclosure relates to a closure device for attaching to a robot, preferably quick closure device and/or for overpressure-tight closing of a cavity of the robot up to at least 175, 200 or 225 mbar. The closure device comprises a removable covering element for covering a cavity of the robot and a fastening apparatus for fastening the covering element to the robot, wherein the fastening apparatus comprises a rotatable closure element. The fastening apparatus is characterized in particular in that it has a rotational closing movement between 45° and 215° and thus can be moved by a rotational closing movement between 45° and 215° into a closure position.

18 Claims, 11 Drawing Sheets

<table>
</table>

(51) Int. Cl.

| | |
|---|---|
| *B25J 19/00* | (2006.01) |
| *E05B 41/00* | (2006.01) |
| *E05C 3/14* | (2006.01) |
| *F16B 5/02* | (2006.01) |
| *F16B 5/10* | (2006.01) |
| *F16B 21/02* | (2006.01) |
| *F16B 21/04* | (2006.01) |

(52) U.S. Cl.
CPC ............... *E05B 41/00* (2013.01); *E05C 3/14* (2013.01); *F16B 5/0208* (2013.01); *F16B 5/10* (2013.01); *F16B 21/02* (2013.01); *F16B 21/04* (2013.01); *Y10T 292/1039* (2015.04); *Y10T 292/1099* (2015.04)

(58) Field of Classification Search
CPC ......... Y10T 292/0866; Y10T 292/0867; Y10T 292/0868; E05B 17/2046; E05B 41/00; E05B 17/0025; E05B 17/2042; E05B 17/2061; E05B 17/2065; E05B 65/0057; E05B 65/0089; E05B 65/006; E05B 2015/0465; E05B 2015/0472; F16B 21/04; F16B 5/10; F16B 5/0208; F16B 21/02; B25J 11/0075; E05C 3/14; E05C 5/00; E05C 5/02; E05C 5/04; Y10S 292/11
See application file for complete search history.

(56) References Cited

U.S. PATENT DOCUMENTS

| | | | | |
|---|---|---|---|---|
| 2,378,122 | A * | 6/1945 | Barlow | F16B 5/10 |
| | | | | 411/552 |
| 2,395,695 | A * | 2/1946 | Mills | F16B 5/10 |
| | | | | 220/293 |
| 2,486,670 | A * | 11/1949 | Nigg | F16B 5/10 |
| | | | | 411/533 |
| 2,601,213 | A * | 6/1952 | Ougljesa | F16B 5/10 |
| | | | | 52/489.1 |
| 2,839,808 | A * | 6/1958 | Zahodiakin | F16B 21/186 |
| | | | | 411/517 |
| 3,209,425 | A * | 10/1965 | Barry | F16B 21/02 |
| | | | | 411/436 |
| 3,327,363 | A * | 6/1967 | Knight | F16B 5/10 |
| | | | | 411/555 |
| 3,673,913 | A * | 7/1972 | Barry | F16B 21/04 |
| | | | | 411/34 |
| 3,709,086 | A | 1/1973 | Johnson | |
| 3,802,033 | A * | 4/1974 | Gley | F16B 21/04 |
| | | | | 411/549 |
| 3,811,157 | A * | 5/1974 | Schenk | F16B 21/04 |
| | | | | 403/349 |
| 4,207,655 | A | 6/1980 | Macmaster et al. | |
| D255,772 | S * | 7/1980 | Johnson | D8/382 |
| 4,385,851 | A * | 5/1983 | Bellamy | F16B 5/10 |
| | | | | 403/325 |
| 4,408,429 | A * | 10/1983 | Neal | E04G 23/0207 |
| | | | | 52/514 |
| 4,442,571 | A * | 4/1984 | Davis | F16B 5/10 |
| | | | | 24/DIG. 59 |
| 4,929,185 | A * | 5/1990 | Wong | H01R 12/52 |
| | | | | 439/97 |
| 5,323,364 | A | 6/1994 | Hayashi et al. | |
| 5,361,925 | A * | 11/1994 | Wecke | H02G 3/14 |
| | | | | 220/325 |
| 5,564,860 | A * | 10/1996 | Amann | E03F 5/06 |
| | | | | 411/549 |
| 5,690,460 | A * | 11/1997 | Attanasio | F16B 5/10 |
| | | | | 411/553 |
| 7,152,892 | B2 * | 12/2006 | Rechberg | E05C 19/022 |
| | | | | 292/300 |

| | | | | |
|---|---|---|---|---|
| 7,874,779 | B2 | 1/2011 | Csik et al. | |
| 8,282,329 | B2 | 10/2012 | Bowers et al. | |
| D747,952 | S * | 1/2016 | Attanasio | D8/349 |
| 9,243,656 | B2 | 1/2016 | Pfannenberg | |
| 9,662,795 | B2 * | 5/2017 | Yamaguchi | B25J 19/0075 |
| D797,544 | S * | 9/2017 | Attanasio | D8/349 |
| 10,427,616 | B2 * | 10/2019 | Wilckens | B60R 11/00 |
| 11,167,699 | B2 * | 11/2021 | Wilckens | B60R 11/00 |
| 2005/0045415 | A1 | 3/2005 | Popken et al. | |
| 2006/0156547 | A1 * | 7/2006 | Tarahomi | C25D 13/12 |
| | | | | 296/193.09 |
| 2009/0028660 | A1 | 1/2009 | Csik et al. | |
| 2011/0123296 | A1 | 5/2011 | Csik et al. | |
| 2011/0262242 | A1 * | 10/2011 | Marlow | F16B 13/0841 |
| | | | | 411/333 |
| 2013/0149072 | A1 | 6/2013 | Pfannenberg | |
| 2013/0255428 | A1 * | 10/2013 | Hahakura | B25J 9/0009 |
| | | | | 901/23 |
| 2014/0341634 | A1 | 11/2014 | Chatwin et al. | |
| 2015/0248975 | A1 | 9/2015 | Bonfanti | |
| 2017/0158144 | A1 * | 6/2017 | Wilckens | F16B 21/04 |
| 2018/0051735 | A1 * | 2/2018 | Stenyakin | F16B 21/09 |
| 2019/0375340 | A1 * | 12/2019 | Wilckens | F16B 21/04 |

FOREIGN PATENT DOCUMENTS

| | | | | |
|---|---|---|---|---|
| CN | 202684913 | U | 1/2013 | |
| CN | 203684982 | U | 7/2014 | |
| CN | 104641515 | A | 5/2015 | |
| CN | 104728227 | A * | 6/2015 | B25B 11/02 |
| DE | 2534375 | A1 | 2/1977 | |
| DE | 19530034 | A1 | 2/1997 | |
| DE | 60312295 | T2 | 7/2007 | |
| DE | 202011052482 | U1 | 3/2012 | |
| DE | 102011055591 | A1 | 5/2013 | |
| DE | 202013004176 | U1 * | 9/2014 | F16B 21/04 |
| DE | 102021001649 | A1 * | 9/2022 | F16B 5/10 |
| EP | 0117217 | A1 * | 2/1984 | F16B 5/10 |
| EP | 0674056 | A1 * | 9/1995 | E02D 29/1427 |
| EP | 1220592 | A1 * | 7/2002 | H01R 12/7029 |
| EP | 1758441 | A2 * | 2/2007 | F16B 5/0208 |
| EP | 1894684 | A1 * | 3/2008 | B25J 19/0075 |
| EP | 2632002 | A1 | 8/2013 | |
| EP | 3021438 | A1 * | 5/2016 | H02G 3/088 |
| FR | 2818252 | A1 | 6/2002 | |
| FR | 2861783 | A1 * | 5/2005 | E05B 3/065 |
| FR | 2922934 | A1 * | 5/2009 | E05B 17/2069 |
| GB | 462482 | A | 3/1937 | |
| GB | 551295 | A * | 4/1942 | F16B 5/10 |
| GB | 587288 | A * | 4/1947 | F16B 5/10 |
| GB | 590483 | A * | 7/1947 | F16B 5/10 |
| GB | 646555 | A * | 11/1948 | F16B 5/10 |
| GB | 1509287 | A | 5/1978 | |
| GB | 2257461 | A | 1/1993 | |
| GB | 2469855 | A * | 11/2010 | H01R 13/213 |
| GB | 2494474 | A | 3/2013 | |
| GB | 2494767 | A * | 3/2013 | B60N 3/103 |
| GB | 2511609 | A * | 9/2014 | B60N 3/103 |
| JP | H04-346497 | A | 12/1992 | |
| JP | H08501140 | A * | 2/1996 | F21V 19/006 |
| JP | H10-303571 | A | 11/1998 | |
| JP | 2002127073 | A | 5/2002 | |
| JP | 2007033316 | A | 2/2007 | |
| JP | 4145903 | B2 * | 9/2008 | G01R 11/24 |
| KR | 200332153 | Y1 | 11/2003 | |
| WO | WO-2007104463 | A1 * | 9/2007 | F16B 21/02 |
| WO | WO-2009015162 | A1 * | 1/2009 | F16B 21/04 |

OTHER PUBLICATIONS

International Search Report and Written Opinion for PCT/EP2017/081130 mailed Mar. 19, 2018 (16 pages; with English translation).
JPO Search Report for Application No. JP2019-531174 mailed Jul. 13, 2021 (14 pages; with English translation).

(56)          References Cited

OTHER PUBLICATIONS

Korean Intellectual Property Office Notice of Preliminary Rejection
for related application No. KR10-2019-7015859 mailed Sep. 28,
2022 (with English translation).

* cited by examiner

100

101

3

3

CLOSURE DEVICE FOR ATTACHING TO A ROBOT

CROSS-REFERENCE TO RELATED APPLICATIONS

This application is a national stage of, and claims priority to, Patent Cooperation Treaty Application No. PCT/EP2017/081130, filed on Dec. 1, 2017, which application claims priority to German Application No. DE 10 2016 014 660.5, filed on Dec. 9, 2016, which applications are hereby incorporated herein by reference in their entireties.

BACKGROUND

The disclosure relates to a closure device for attaching to a robot, preferably a quick closure device. The closure device serves in particular for overpressure-tight closing of a cavity of the robot up to at least 175, 200 or 225 mbar. The robot is e.g. a painting or coating robot.

Industrial robots generally have robot housings or robot arms with cavities. For optimal rigidity and weight distribution, most of the material of the robot housings and robot arms are arranged so that the force and momentum profile is used via an outer supporting structure.

The cavities are generally accessible from the outside and are used partially to guide cables, to receive components (e.g. motors, gearboxes, etc.) etc.

The fact whether the cavities are open towards the outside or not generally plays a subordinate role for welding or handling robots.

If robots are however used for coating, in particular painting, it is advantageous or even essential that the cavities are closed towards the outside, e.g. on the grounds of explosion protection, or to protect cables, components, etc. arranged therein from contamination or wear. In particular paint/varnish mist, overspray and other dirt present great problems for coating and painting robots.

One major challenge is to develop robots, in particular painting robots, so that country-specific explosion protection requirements are satisfied. Since it has become increasingly important over time to design the process and reaction times to be as quick and precise as possible, it is important to position the control valves required for this purpose in spaces as close as possible to the application device. Further necessary components, such as e.g. drives, motors, plugs, terminals, etc., can also be positioned in the same spaces.

These spaces are generally sealed off in an airtight manner by covers. Experience has shown that country-specific explosion protections authorisations are usually only possible with a pressurised enclosure or at least with a cavity (in particular robot housing) which is airtight, dust- and spray mist-resistant and also impervious to fluids.

The better the constructive example of the covers for covering/closing the cavities in relation to the required properties mentioned above, the better servicing can be carried out and the lower the frequency of faults.

In practice, covers are usually equipped with flexible seals. One major challenge in the generation of pressure-tight cavities is that the seals are not detached or do not swell up during cleaning of the robots by solvents or detergents and paint residues which may be present do not enter into gaps and additionally clog the seals as a result of this.

The following standards/requirements must be satisfied in relation to explosion protection with pressurised enclosure for painting robots. A differentiation is made in part between different operating phases:

flushing phase with overpressure for flushing free of a mixture capable of exploding prior to operation operating phase with slight overpressure in compensation operation, in the case of small leaks, the required overpressure is compensated by adjustment with air control and electronic pressure monitoring. Depending on the paint system and requirement, further different standards must be adhered to e.g. in accordance with ATEX Directive 94 and/or 95 EC. Redundancy is in part necessary.

All of the requirements for European operation are regulated by the standard DIN EN 60079-2 (Equipment protection by pressurized enclosure "p").

Depending on the requirement and the degree of protection, an overpressure of up to 40 mbar prevails during the flushing phase since the robot should be flushed quickly and a certain dynamic pressure is generated through the air outlet with integrated check valve. One aim is, for example, to flush a robot with an air volume of 200 litres and various branched air regions in less than 3 minutes with air or inert gas.

In order to achieve protection during operation, depending on the division into the specific equipment group, 50 Pa must be permanently present, for example, in the case of the simplified system "2py" and 25 Pa must be permanently present in the case of the system "pz" (Chapter 7.1 respectively in the above-mentioned standard).

The pressure requirements and the requirements in terms of imperviousness are even higher for American explosion protection.

American regulation of the standard fire protection association NFPA 496—STANDARD FOR PURGED AND PRESSURIZED ENCLOSURES FOR ELECTRICAL EQUIPMENT—prescribes, in a similar manner to the European standard, 5 times overpressure safety in relation to the chosen or constructively intended max. pressure. In the case of this overpressure test, the leakage rate must also not exceed a certain value.

Various other standards prescribe the following further requirements:

DIN EN 60079-0 Section 20 prescribes the following e.g. for covers of pressurised enclosure systems such as, for example, painting robots with pressurised enclosure: opening of housings (and covers) must be prevented by the need to use a corresponding tool (e.g. hexagon socket screw or torx screw).

EN 13463-5—Non-electrical equipment intended for use in potentially explosive atmospheres, Part 5—: Protection by constructional safety "c" prescribes, for example, a drop test with a corresponding testing tool.

Similar requirements apply in above-mentioned American regulation NFPA 496 and NFPA 33.

Requirements in relation to the covers and their mounting on the robot primarily lie in adhering to the above-mentioned standards and their conditions.

The requirements are in particular:

A. opening covers at least at one point only with a tool
B. cavities pressure-tight up to an overpressure of min. 200 mbar without noteworthy leakage
C. cover and sealing quality secure over service life or seal resistant to ageing over a defined period of time, see NFPA 496
D. All of the components such as also covers, closures, etc. must withstand a drop test with a defined test body from 1 m, see ATEX directive Further aims or specific requirements from various experiences in relation to painting robots are in particular:

E. seals solvent-resistant and additionally protected from the outside so that no paint residues reach and/or clog the seal F. seals fixed in a cover groove, but easily exchangeable G. clear and defined closure and unlocking process of the covers H. unlocking and removal of covering elements which require access for quick maintenance, under 30 seconds by one person I. reducing the closures for each cover J. opening and closing movement for covers can be carried out with one hand K. opening and closing movement can be carried out quickly L. optically apparent at the location of the closure whether the closure is open or closed.

M. closure system exchangeable

N. emergency unlocking by auxiliary tool if the opening feature is unusable as a result of incorrect use or wear.

In practice, covers are normally mounted on the robots with screws. Depending on the size of the covers, usually up to 20 or even more than 20 screws are used. Depending on size, one cover must usually be held with 2 hands, wherein a second operator attempts to screw in the screws one by one in various steps. It should be ensured here that all the screws act in each case on the associated thread. Since the thread is usually not visible, a certain degree of practice, skill and experience is required of the operator. The screws are generally initially only provisionally tightened. As a result, all of the screws are then usually tightened one by one with a nominal torque and checked again. If e.g. a thread is damaged during tightening of the screw, the damaged thread must be replaced or repaired, if at all possible in the first place.

The screw-based mounting process not only requires a lot of time and often two operators, but also requires a certain degree of practice, experience and skill.

In practice, seals, in particular flat seals, for the covers are often glued on to prevent slipping during tightening of the screws. The bearing surface for the flat seal is usually relatively small. The seal is weakened by the screw holes in the region of the screws. Holes for the screws are generally freely punched and penetrate through the seals. If the seal is slightly worn, leaks generally occur in the region of the screws. Some flat seals often age as a result of excessive pressure due to incorrect cover mounting and simultaneously by contact in the edge region as a result of solvents and the action of UV.

DETAILED DESCRIPTION

Figure 1:
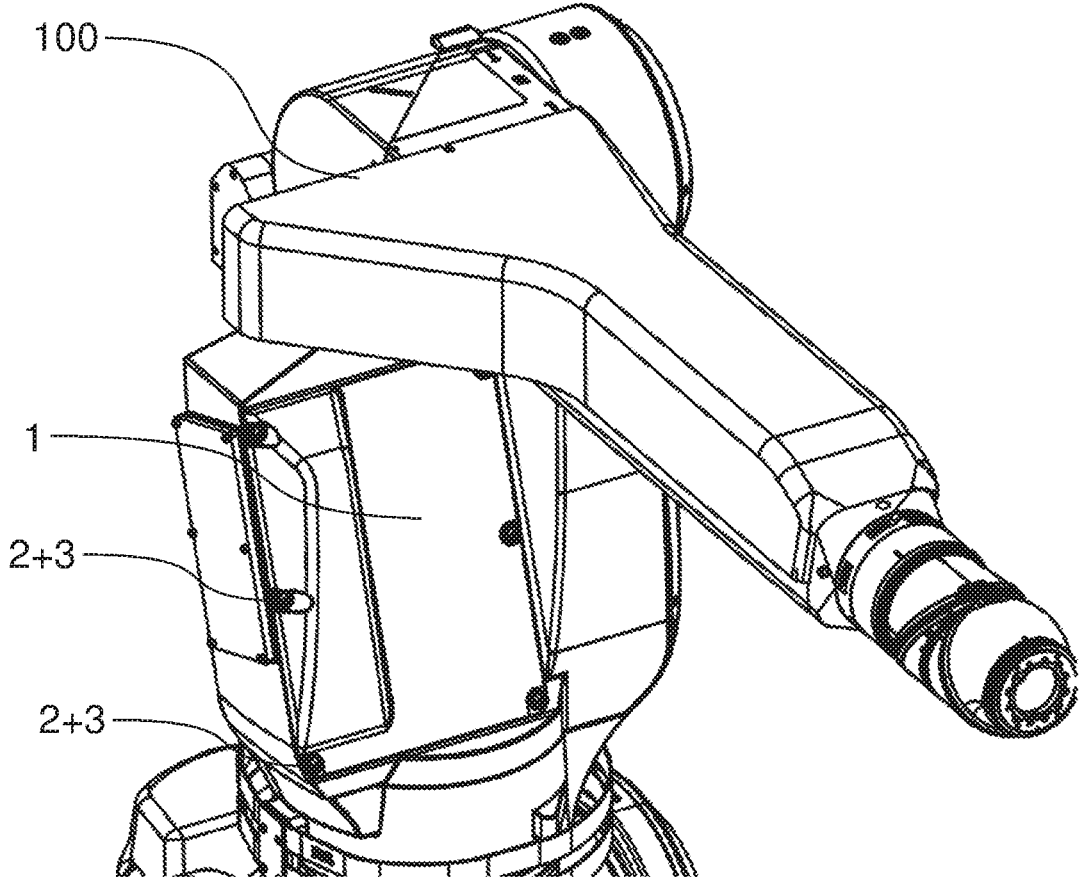
FIG. 1 shows a robot with a closure device according to one example of the disclosure.

The disclosure creates a closure device for attaching to a robot which enables simple, rapid and secure, in particular pressure-tight, covering and in particular sealing of a cavity of a robot. Moreover, e.g. at least one, but preferably, however, all of the stated criteria A to N noted in the Background can be satisfied.

The disclosure relates to a closure device for attaching to a robot, preferably for overpressure-tight closing of a cavity of the robot up to an overpressure of at least 175 mbar, 200 mbar or 225 mbar, expediently without noteworthy leakage, in particular up to at least 5 times the flushing pressure.

The closure device is preferably embodied as a quick closure device.

The robot can be e.g. a painting or coating robot.

The closure device comprises an expediently removable covering element (e.g. cover and/or housing plate) for covering a cavity of the robot (e.g. a housing or arm of the robot) and a fastening apparatus for fastening of the covering element to the robot. The fastening apparatus comprises a rotatable closure element (e.g. closure bolt). The fastening apparatus can preferably also comprise a closure bushing for the closure element.

The fastening apparatus is characterised in particular in that it has a rotational closing movement between 45° and 215° and thus can be moved by a rotational closing movement between 45° and 215° into a closure position which can preferably be latched and/or friction-fixed.

As a result of this, the fastening apparatus enables in particular the realisation of a securely closing quick closure device.

It is possible that the fastening apparatus has a rotational closing movement between 60° and 120°, preferably 80° and 100°, and thus can be moved by a rotational closing movement between 60° and 120°, preferably 80° and 100°, into a closure position.

The closure element can have at least one nose, wherein the at least one nose is rotatable together with the closure element. The at least one nose preferably serves for fastening in the closure bushing of the fastening apparatus. Alternatively or additionally, the at least one nose may serve to pre-centre the closure element in particular by shaping. As a result of the at least one nose, it can therefore be enabled that the closure element can find the respectively correct alignment relative to the closure bushing with the aid of pre-centring itself as a result of shaping.

It is possible that that the closure element has a first bearing ring and/or a second bearing ring between which the covering element can be arranged. The first and/or second bearing ring can be e.g. substantially circular ring-shaped, substantially square or rectangular, etc. and be formed optionally e.g. closed or open or slotted in the circumferential direction ("slotted ring").

The fastening apparatus can have in particular a closure bushing for receiving and fastening of the closure element in sections.

The closure bushing can preferably expediently be mounted on or in the robot, expediently fixed to the robot, but preferably exchangeably.

The closure bushing can have in particular at least one slope construction (e.g. ramp construction) for the at least one nose in order to generate a closing stroke of the closure element.

In particular, a latch-in and/or friction-fixable closure position is possible in the context of the disclosure.

The at least one slope construction can lead e.g. to a locking depression (e.g. a latching depression) for locking (e.g. latching) the at least one nose. Alternatively or additionally, e.g. a locking of the at least one nose in the closure bushing can be achieved by friction.

It is possible that the at least one slope construction has a slope towards a high or turning point (e.g. inflexion point). The at least one slope construction can have a subsection with a reduced or negative slope e.g. in the closing rotational direction of the closure element behind the high or turning point.

The at least one slope construction can have e.g. at least one discontinuity (e.g. a high, low and/or turning point and alternatively or additionally an increase in pitch and/or reduction in pitch) which can be haptically noticed by an operator during passing of the at least one nose. As a result of this, it can e.g. be enabled that the operator can be communicated in a haptically noticeable manner of a reaching of the closure position (e.g. a latching) and/or the progression of the closing process during rotation of the closure element.

The at least one slope construction can have preferably at least two discontinuities.

The at least two discontinuities can be formed e.g. by the high or turning point and an additional turning point (e.g. inflexion point) in the closing rotational direction of the closure element behind the sub-region and/or in the closing rotational direction of the closure element in front of the locking depression.

It is particularly preferred that a reaching of the closure position as a result of latching in of the at least one nose and/or a stop for the at least one nose is haptically noticeable for an operator.

The locking depression can be formed in the closing rotational direction of the closure element preferably behind the high or turning point, behind the sub-section and/or behind the additional turning point.

The closure bushing can have at least one stop for the at least one nose in particular to restrict the closing rotational movement of the closure element. The stop preferably delimits the at least one slope construction in the closing rotational direction of the closure element.

The closure bushing can comprise at least one centring opening for the at least one nose for pre-centring of the closure element. For this purpose, an inlet opening of the closure bushing can be formed to be non-round and/or rotationally unsymmetrical by means of the at least one centring opening.

The fastening apparatus can comprise e.g. an actuation element for the generation of an additional compressive force in the direction of the covering element and thus in particular in the direction of the robot. The actuation element thus preferably acts as a closing force amplifier and as a compensating element in order to compensate for the minimally reduced stroke after the "exceeding" of the turning point described above.

The actuation element can comprise e.g. a spring, a spiral spring, a plate spring and/or an elastically deformable plastic component.

It is possible that two noses, two slope constructions and/or two centring openings are provided which are preferably oriented in each case in opposite directions, e.g. offset by substantially 180°.

The closure device can comprise an e.g. elastic seal for arrangement between the covering element and the robot (e.g. robot housing, robot arm, etc.) and the seal can be pressed by means of the fastening apparatus.

The seal is preferably a plastic seal, e.g. composed of an elastic material.

It is possible that the seal is an air chamber seal, has at least one sealing lip and/or runs in a groove. The groove can be formed in the covering element and/or in the robot.

The closure element and/or the closure bushing can be embodied to achieve the closure position preferably in a thread-free manner.

The seal can e.g. be arranged at a distance from the fastening apparatus and/or be shielded by the covering element with respect to the outside of the robot.

It is possible that the closure element has a head section with a tool engagement structure (e.g. triangular, square, pentagonal or hexagonal or other suitable forms).

It is possible that the closure element has a shaft section, wherein the at least one nose projects from the shaft section, the first bearing ring and/or the second bearing ring is/are arranged around the shaft section, and/or the actuation element is arranged around the shaft section.

The fastening apparatus can have e.g. an indicator, at the position of which it is optically apparent whether the fastening apparatus is in the closing position or not.

The closure device is preferably embodied to form a pressurised enclosure. The covering element serves in particular to cover a cavity of the robot, e.g. to cover and/or close off a robot arm or robot housing.

It should be mentioned that the at least one discontinuity, the high point and/or the turning point can preferably be formed in the form of a bend or threshold e.g. in order to be haptically noticed by an operator as a substantially abrupt transition. The at least one discontinuity, the high point and/or the turning point can nevertheless also expediently be realised by an increase in pitch and/or decrease in pitch, e.g. in order to be able to be haptically noticed by the operator as a substantially "smooth" (e.g. even, fluid, curved and/or non-bent) transition.

The fastening apparatus can preferably be closed by a rotational closing movement in the clockwise direction and can be opened by a rotational opening movement in the anticlockwise direction, wherein the reverse variant is also possible.

The cavity can be e.g. part of a pressurized enclosure.

The disclosure also comprises a robot, preferably a painting or coating robot, with at least one closure device as disclosed herein.

It is possible that the closure device with the covering element serves the purpose of covering and pressure-tight closure of a robot arm or robot housing so that e.g. a pressurized enclosure can be formed as a result of this.

Figure 2:
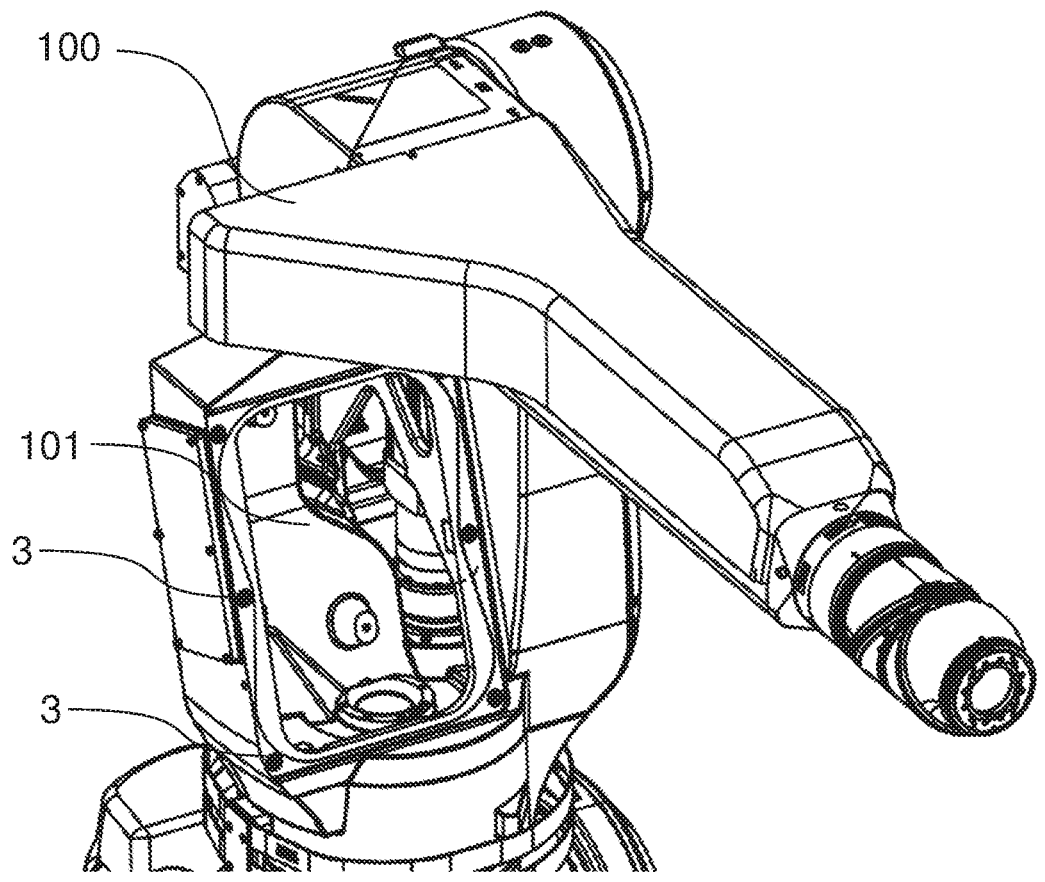
FIG. 2 shows the robot of FIG. 1 with a removed covering element.
Figure 3:
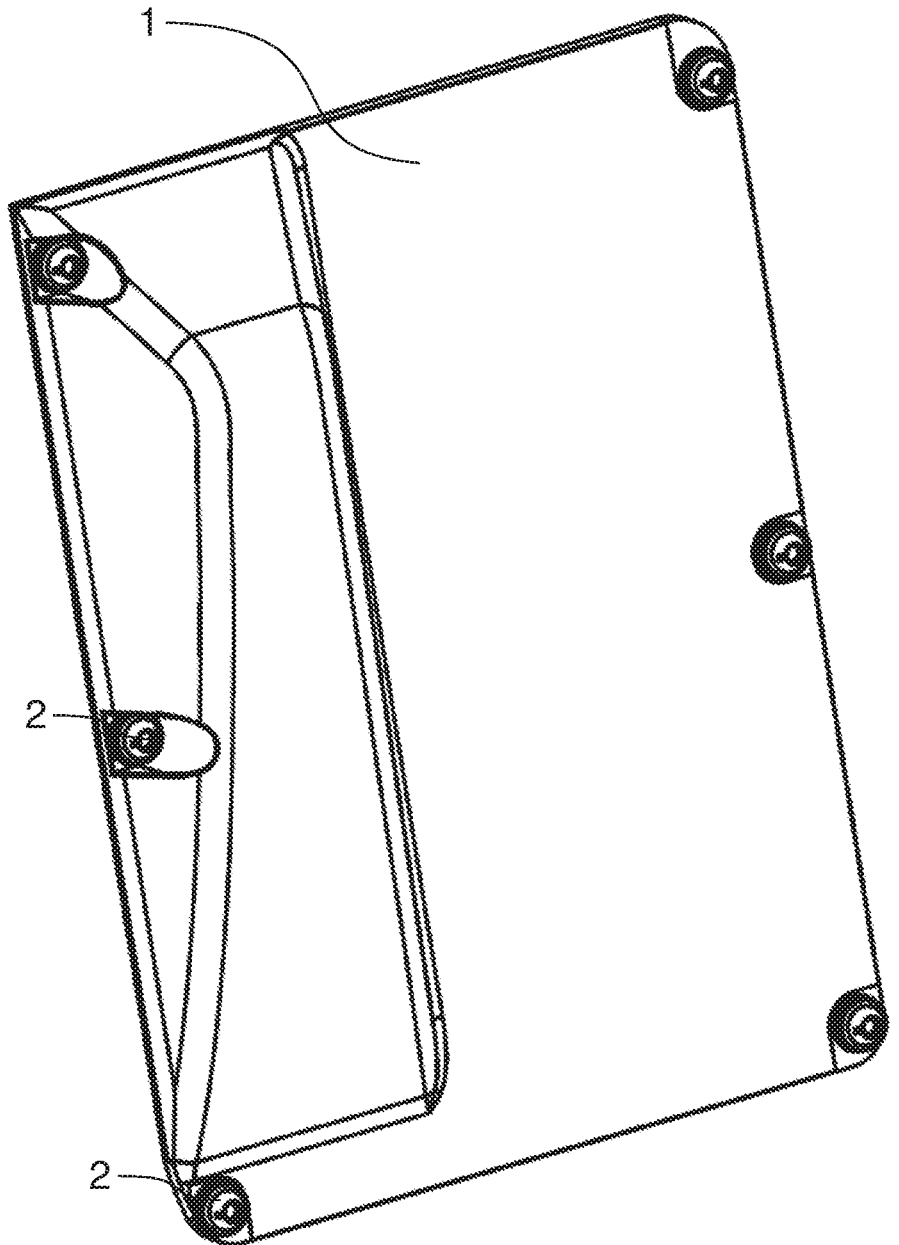
FIG. 3 shows a perspective view of the covering element of FIG. 1.

FIG. 1 shows a perspective view of a robot 100, in particular a painting or coating robot 100, with a closure device according to one example of the disclosure and with covering element 1 mounted on robot 100. FIG. 2 shows robot 100 with removed covering element 1, wherein FIG. 3 shows a perspective view of covering element 1. The closure device is described below with joint reference to FIGS. 1 to 3.

The closure device is embodied as a quick closure device and serves in particular for overpressure-tight sealing and covering of a cavity 101 of robot 100 (e.g. a robot housing or a robot arm) up to at least 200 mbar. Covering element 1 is fastened to robot 100 by means of six fastening apparatuses 2, 3. For the purpose of clarity, only in each case two fastening apparatuses are provided with reference numbers in FIGS. 1 to 3.

Fastening apparatus 2, 3 comprises a rotatable closure element (closure bolt) 2 and a closure bushing 3 mounted on or in robot 100 for closure element 2, in particular for receiving and fastening closure element 2 in sections.

Fastening apparatus 2, 3 has a rotational closing movement of substantially 90° so that it can be moved by a rotational closing movement of substantially 90° into a closure position. Larger and smaller rotational closing movements are nevertheless also possible in the context of the disclosure. A rotational closing movement of substantially 90° can generate e.g. a closing stroke of approximately 3 mm.

The mounting process of covering element 1 is carried out substantially as follows: covering element 1 is placed by an operator (worker) with two hands on robot 100, in particular a housing or robot arm of robot 100. The operator then holds covering element 1 with one hand on robot 100 and then gradually closes six closure elements 2 with the other hand with an approx. 90° rotation. The entire closing process can be realised in under 30 seconds.

Figure 4:
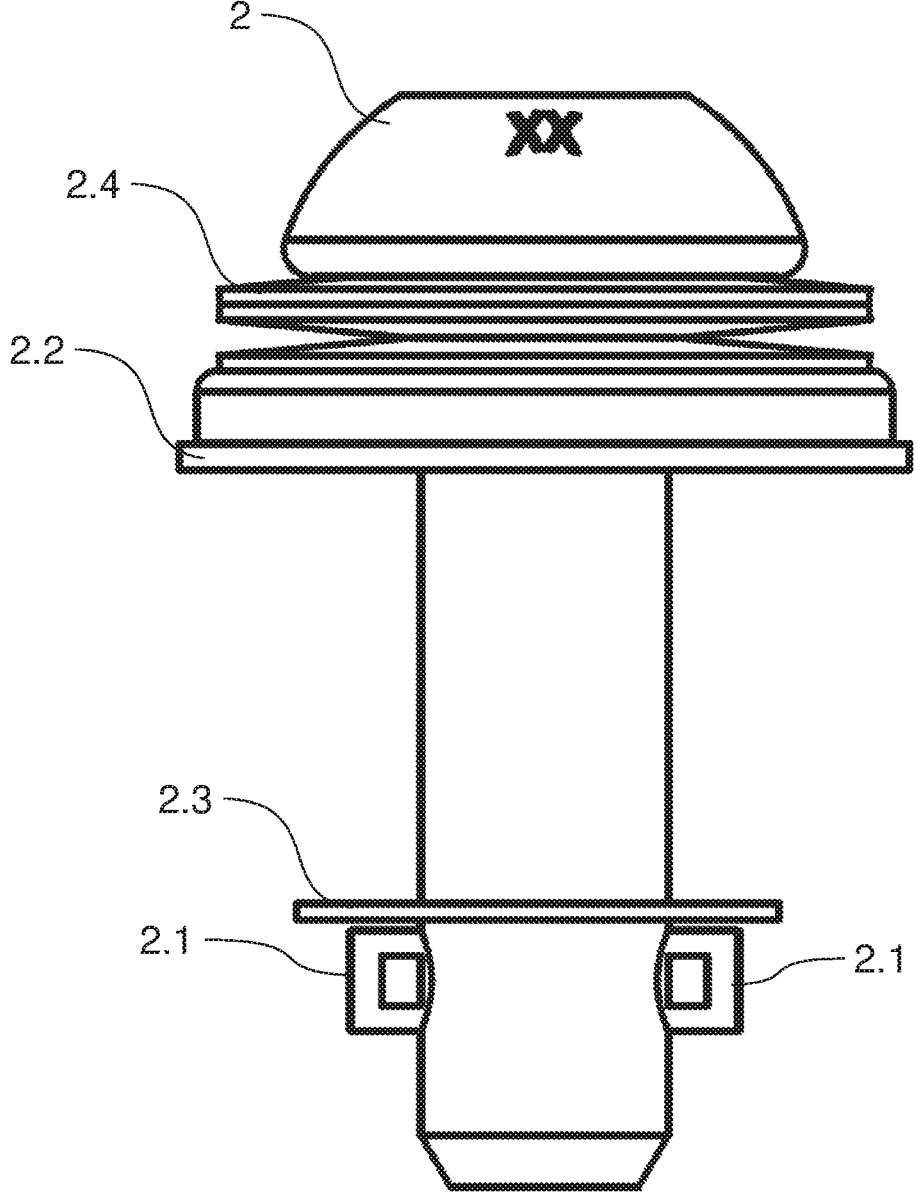
FIG. 4 shows a side view of a closure element of a closure device according to one example of the disclosure.
Figure 5:
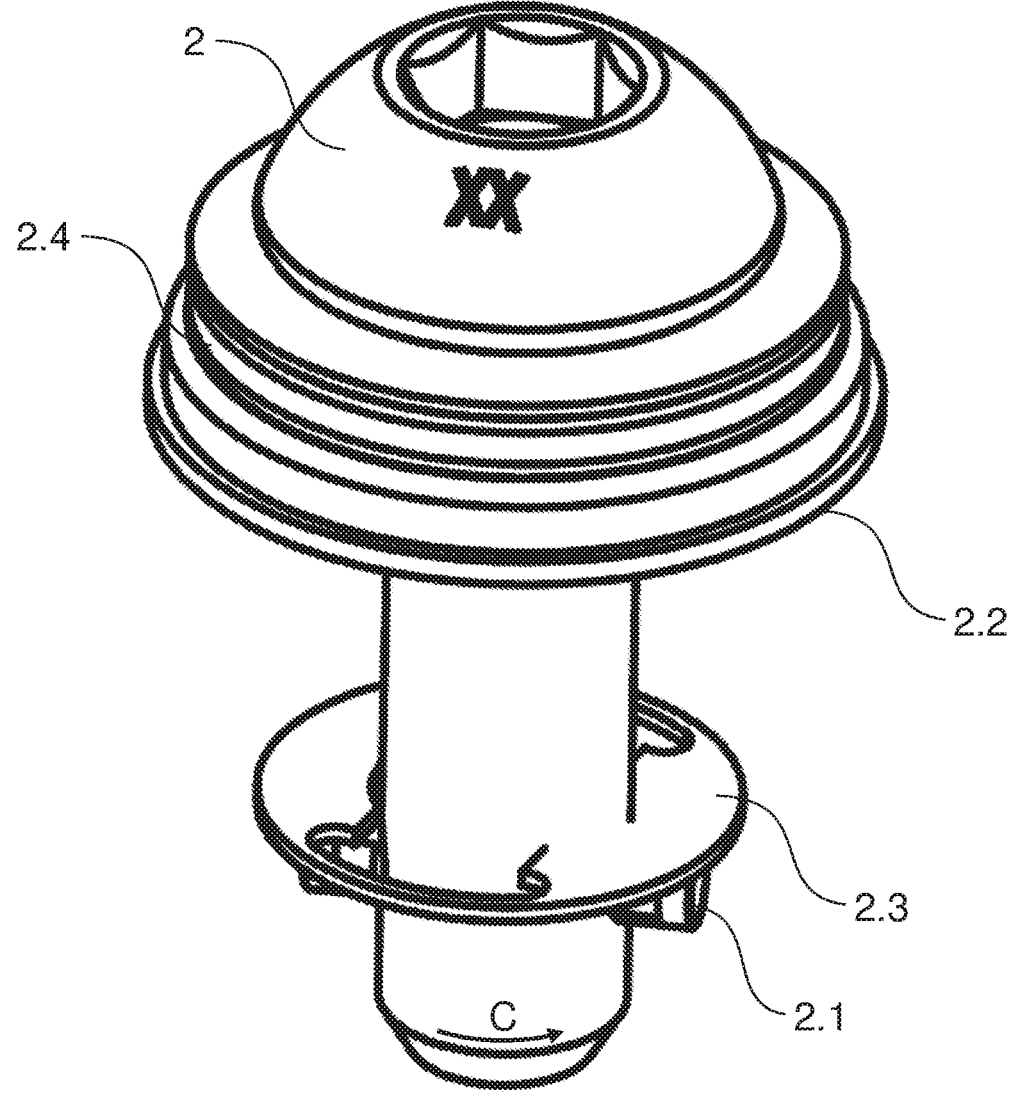
FIG. 5 shows a perspective view of the closure element.
Figure 6:
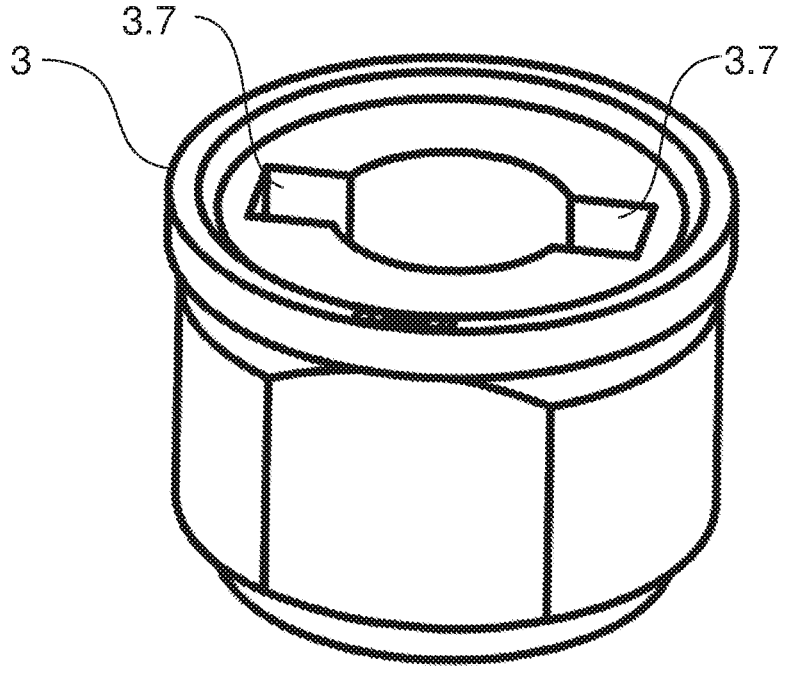
FIG. 6 shows a perspective view of a closure bushing of the closure device according to one example of the disclosure.
Figure 7:
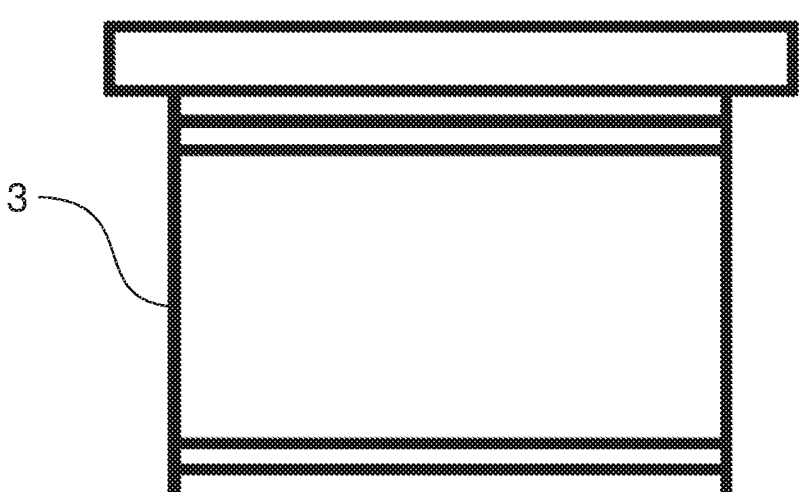
FIG. 7 shows a side view of the closure bushing.
Figure 8:
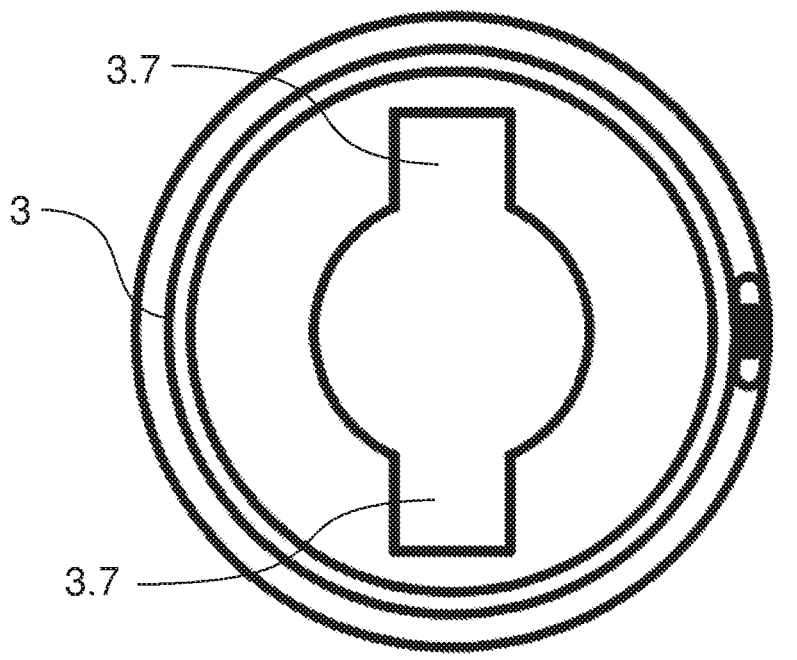
FIG. 8 shows a top view of the closure bushing.
Figure 9:
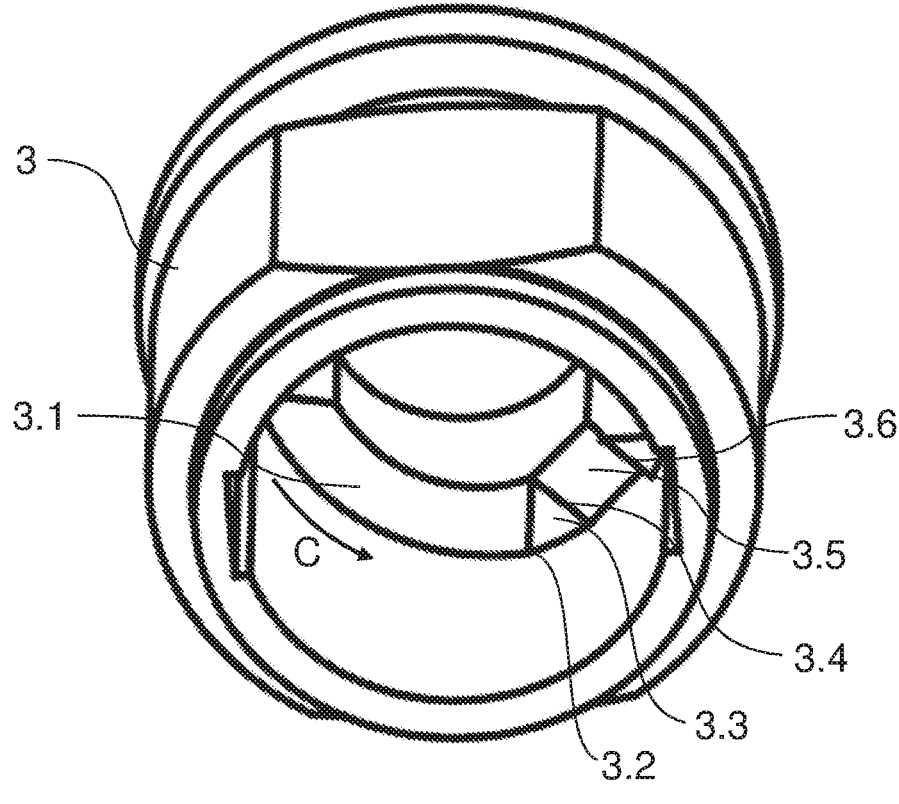
FIG. 9 shows another perspective view of the closure bushing.
Figure 10:
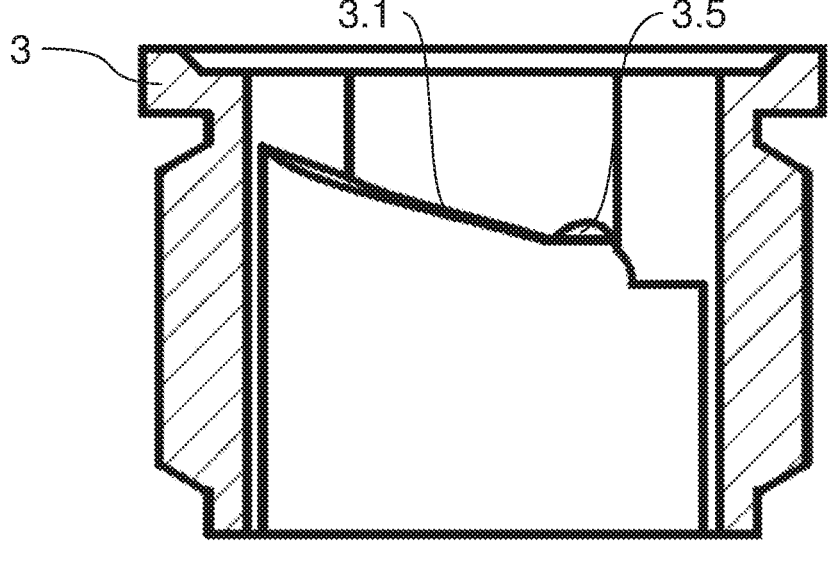
FIG. 10 shows a sectional view of the closure bushing.
Figure 11:
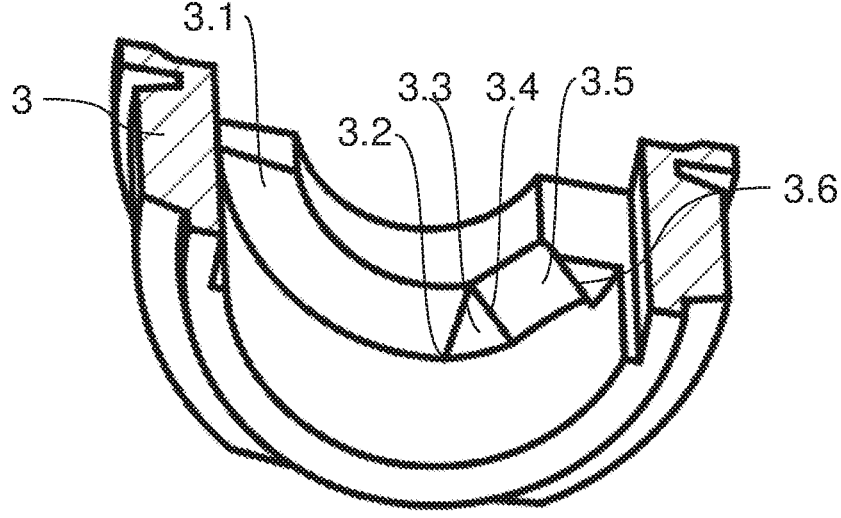
FIG. 11 shows a perspective sectional view of the closure bushing.
Figure 12:
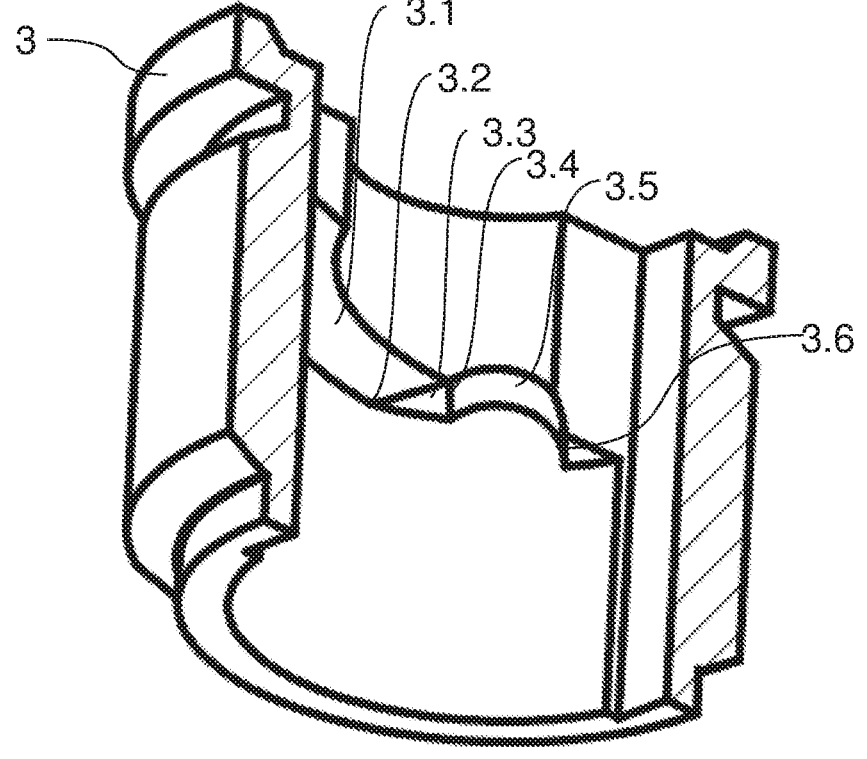
FIG. 12 shows another perspective sectional view of the closure bushing.

FIGS. 4 and 5 show various views of closure element 2. FIGS. 6 to 12 show various views of closure bushing 3. Closure element 2 and closure bushing 3 are described below with joint reference to FIGS. 4 to 12, wherein, in FIGS. 4 to 12, not all the parts are provided with reference numbers partly for the purpose of clarity.

Closure element 2 comprises (at the top in FIGS. 4 and 5) a head section with tool engagement structure (e.g. inner hexagon) and (thereunder in FIGS. 4 and 5) a shaft section.

Two noses 2.1 protrude from closure element 2, are rotatable together with closure element 2 and serve the purpose of latching-in and/or friction-fixed fastening in closure bushing 3.

Closure element 2 is provided with a first bearing ring 2.2 and a second bearing ring 2.3 between which covering element 1 is arranged. First bearing ring 2.2 can expediently be embodied separately to the head section or as part of the head section.

An actuation element 2.4 arranged around the shaft section serves to generate a compressive force in the direction of covering element 1. Moreover, an axial stroke can be balanced out by actuation element 2.4 e.g. in relation to tolerances. Actuation element 2.4 is preferably a spring, e.g. a spiral or plate spring, can, however, also be an elastically deformable plastic component.

Closure bushing 3 comprises two slope constructions 3.1 for the two noses 2.1, as a result of which a closing stroke of closure element 2 can be generated.

The two slope constructions 3.1 are embodied to be substantially of the same design, but offset by substantially 180° so that only one slope construction 3.1 is described below.

Slope construction 3.1 opens in a locking depression 3.5 for locking, in particular latching in, nose 2.1, wherein, alternatively or additionally, a locking of nose 2.1 by friction is also possible.

Slope construction 3.1 initially comprises a slope towards a high/turning point 3.2.

A sub-section 3.3 with negative pitch is formed in closing rotational direction C of closure element 2 behind high/turning point 3.2.

A further turning point 3.4 is formed in closing rotational direction C of closure element 2 behind sub-section 3.3.

Locking depression 3.5 is formed in closing rotational direction C of closure element 2 behind further turning point 3.4.

A stop 3.6 for nose 2.1 is formed in closing rotational direction C of closure element 2 behind locking depression 3.5 and indeed to restrict the closing rotational movement of closure element 2.

Slope construction 3.1 comprises, as a result of high/turning point 3.2 and further turning point 3.4, two discontinuities. The two discontinuities 3.2 and 3.4 can be haptically noticed by an operator during passing by nose 2.1 during a rotational movement of closure element 2. As a result of this, the operator can be haptically communicated of the progression of the closing process during rotation of closure element 2, in particular reaching of the closure position, i.e. in particular latching of nose 2.1 in locking depression 3.5.

Discontinuities 3.2 and 3.4 can be haptically noticed by the operator as substantially abrupt transitions, wherein "smooth" transitions are also possible in the context of the disclosure, e.g. as a result of a uniform or continuous increase in pitch or decrease in pitch of slope construction 3.1.

The two noses 2.1 simultaneously service to pre-centre closure element 2 by shaping, wherein, for this purpose, closure bushing 3 has two centring openings 3.7.

Figure 13:
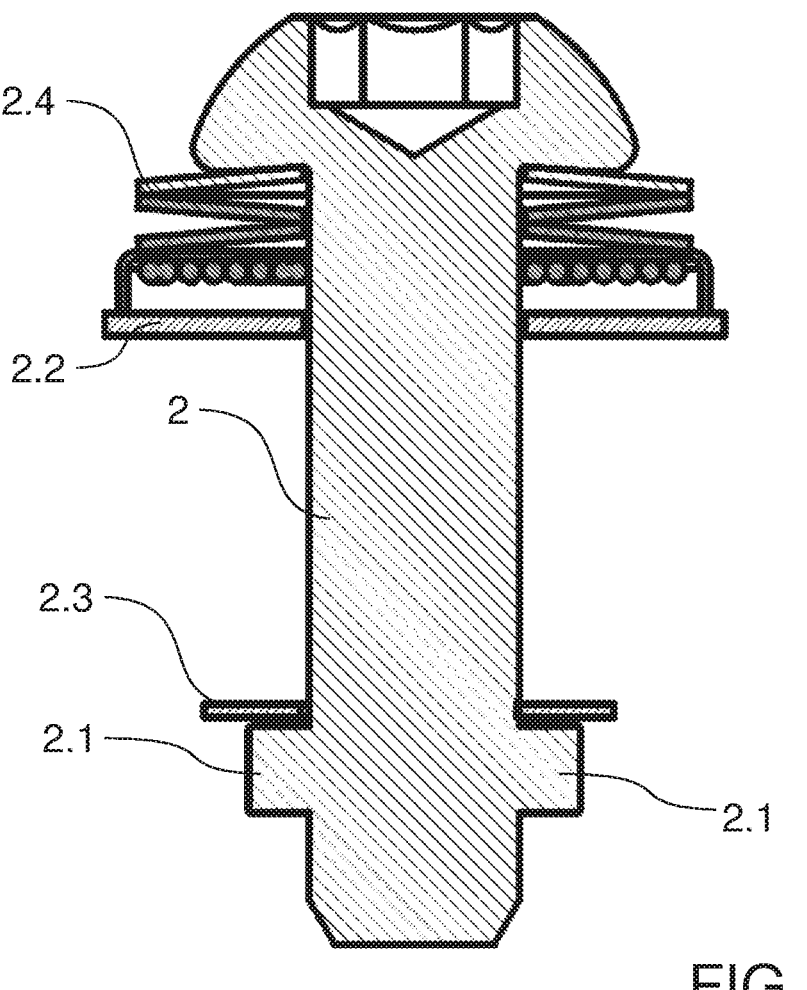
FIG. 13 shows a sectional view of the closure element.
Figure 14:
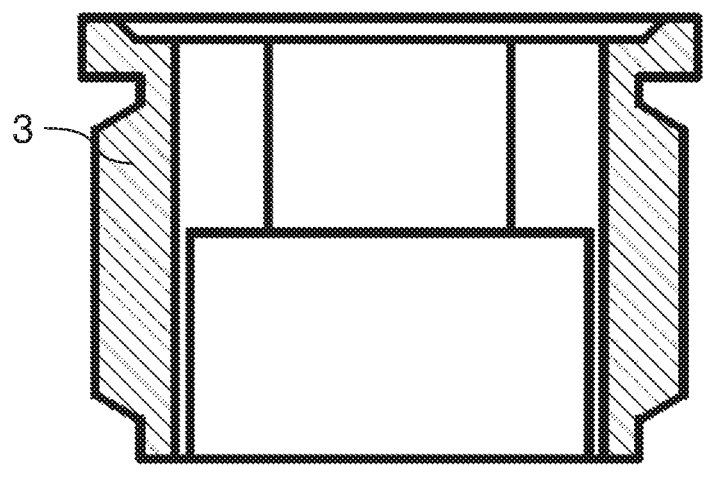
FIG. 14 shows a sectional view of the closure bushing.

FIGS. 13 and 14 shows sectional views of closure element 2 and closure bushing 3, wherein reference is made to the above description for explanation and to avoid repetition.

Figure 15:
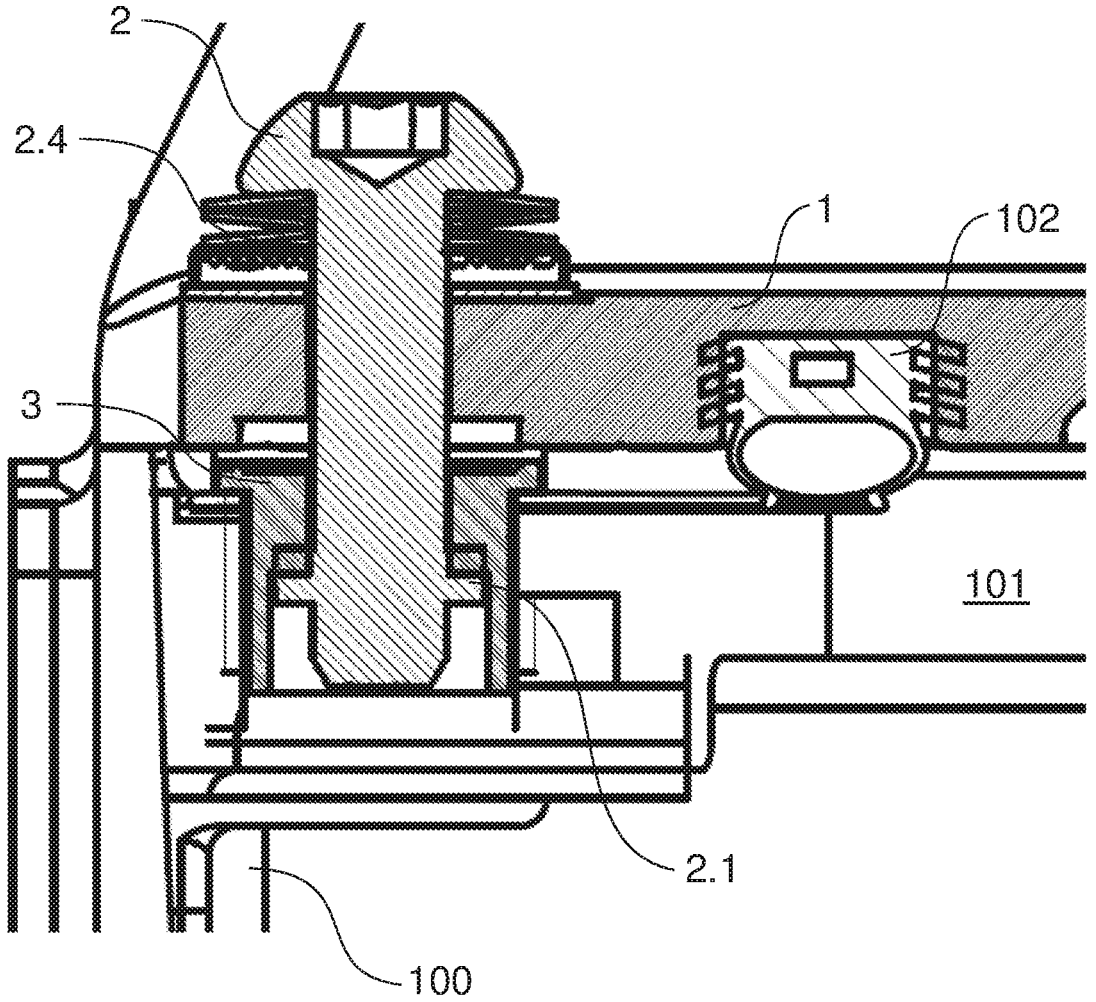
FIG. 15 shows a sectional view of a closure device according to one example of the disclosure in a mounted state.

FIG. 15 shows a sectional view of a robot 100 with mounted-on closure device which can be embodied as described with reference to FIGS. 1 to 14. For the sake of clarity, not all parts are provided with reference numbers in FIG. 15.

FIG. 15 shows, in addition to the closure device with in particular covering element 1, closure element 2 and closure bushing 3, a seal 102 embodied as an air chamber seal.

Covering element 1 serves to cover a cavity 101 of robot 101, e.g. a cavity 101 of a robot housing or of a robot arm. A pressurised enclosure can expediently be formed as a result of this.

Seal 102 comprises two sealing lips and is arranged between covering element 1 and robot 100 and runs in a groove in covering element 1. Seal 102 is pressed (compressed) by means of fastening apparatus 2, 3 so that cavity 101, despite an overpressure of up to at least approx. 200 mbar, is tightly closed and at least no noteworthy leakage occurs.

Seal 102 has a distance from fastening apparatus 2, 3 and is shielded by covering element 1 with respect to the outside of robot 100.

The inner sealing lip makes it possible that the overpressure of up to 5 times the flushing pressure, in practice at least 200 mbar, does not escape to the outside. The outer sealing lip protects against penetration of dirt, fluid, etc., although covering element 1 here already bears substantially tight against robot 100 (e.g. housing or robot arm). The outer sealing lip thus expediently represents a redundancy and additionally protects against pressure leakage.

It should be mentioned that the disclosure also comprises examples with only one nose 2.1, only one slope construction 3.1 and optionally only one centring opening 3.7.

It should furthermore be mentioned that one, several or even all of the following requirements can advantageously be satisfied by means of the closure device:

A. Opening covering element at least at one point only with a tool,

B. cavity/pressurised enclosure (e.g. housing or arm of the robot) pressure-tight up to an overpressure of at least 200 mbar without noteworthy leakage, C. covering element and sealing quality secure over service life and/or seal resistant to ageing over a defined period of time, see e.g. NFPA 496

D. components, in particular covering element and fastening apparatus, must withstand a drop test with a defined test body from 1 m, see e.g. ATEX directive, E. seal solvent-resistant and additionally protected from the outside so that e.g. no paint residues reach and/or clog the seal, F. seal fixed in a groove, but easily exchangeable, G. clear and defined closure and unlocking process, H. unlocking and removal of the covering elements for quick maintenance under 30 seconds by a single person, I. reducing the closures for each covering element, J. opening and closing movement for covering element can be carried out with one hand, K. opening and/or closing state can be realised with a single hand rotation, e.g. by a maximum of 215°, preferably by approx. 90°, L. optically apparent at the location of the closure whether closure is open or closed, M. closure element and/or closure bushing exchangeable, e.g. in the event of damage, N. emergency unlocking by auxiliary tool if the opening feature (e.g. tool engagement structure) is unusable as a result of incorrect use or wear.

The disclosure is not restricted to the preferred example described above. On the contrary, a plurality of variants and modifications are possible which also make use of the concept of the disclosure and thus fall into the scope of protection. The disclosure furthermore also claims protection for the subject matter and the features of the subordinate claims independently of the features and claims referred to.

The invention claimed is:

1. Closure device for a cavity of a robot, the closure device comprising:

a removable covering element covering the cavity of the robot; and a fastening apparatus fastening the covering element to the robot, the fastening apparatus having a rotatable closure element with a rotational closing movement between 45° and 215° into a closure position;

wherein the closure element has a first bearing ring and a second bearing ring between which the covering element is arranged, wherein at least one of the first and second bearing rings includes a radial slot intersecting a circumferential slot;

the fastening apparatus and the removable covering element close the cavity of the robot at least to a pressure of 175 mbar;

the fastening apparatus has a cylindrical closure bushing for receiving and fastening of the closure element in sections;

the closure bushing has at least one slope construction, contained within the cylindrical closure bushing, for at least one nose of the closure element in order to generate a closing stroke of the closure element;

the at least one slope construction has a slope towards a high or turning point, wherein the at least one slope construction has a sub-section with a reduced or negative pitch in the closing rotational direction of the closure element behind the high or turning point; and the at least one slope construction has at least one abrupt discontinuity which is haptically noticeable by an operator during passing of the at least one nose so that the operator is communicated in a haptically noticeable manner of a reaching of the closure position or the progression of a closing process during a rotation of the closure element.

2. Closure device according to claim 1, characterised in that the fastening apparatus has a rotational closing movement between 60° and 120°, and thus is movable by a rotational closing movement between 60° and 120° into the closure position.

3. Closure device according to claim 2, characterised in that the closure element has at least one nose, wherein the at least one nose is rotatable together with the closure element and serves to pre-centre the closure element or for fastening in the closure bushing of the fastening apparatus.

4. Closure device according to claim 1, characterised in that the at least one slope construction leads to a locking depression for locking the at least one nose or a locking of the at least one nose in the closure bushing by friction.

5. Closure device according to claim 1, characterised in that at least two discontinuities are formed by the high or turning point and an additional turning point in the closing rotational direction of the closure element behind the sub-region or in the closing rotational direction of the closure element in front of the locking depression.

6. Closure device according to claim 1, characterised in that a reaching of the closure position as a result of an interlocking of at least one nose of the closure element or a stop for the at least one nose is haptically noticeable for an operator.

7. Closure device according to claim 1, characterised in that the locking depression is formed in the closing rotational direction of the closure element behind the high or turning point, behind the sub-section or behind the additional turning point.

8. Closure device according to claim 7, characterised in that the closure bushing has at least one stop for the at least one nose in order to restrict the closing rotational movement of the closure element.

9. Closure device according to claim 8, characterised in that the closure bushing comprises at least one centring opening for the at least one nose for pre-centring of the closure element.

10. Closure device according to claim 1, characterised in that the fastening apparatus has an actuation element for the generation of a force in the direction of the covering element.

11. Closure device according to claim 10, characterised in that the actuation element comprises at least one of the following:

a spring, a spiral spring, a plate spring, an elastically deformable plastic component.

12. Closure device according to claim 1, characterised by at least one of the following features:

two noses, two slope constructions, two centring openings.

13. Closure device according to claim 1, characterised in that the closure device comprises a seal between the covering element and the robot, the seal pressed by the fastening apparatus, the seal sealing the cavity of the robot at least to a pressure of 200 mbar.

14. Closure device according to claim 13, characterised in that the seal is an air chamber seal, has at least one sealing lip or runs in a groove.

15. Closure device according to claim 14, characterised in that the seal has a distance from the fastening apparatus for sufficient seal contact and is shielded from the outside of the robot by the covering element.

16. Closure device according to claim 1, characterised in that the closure element has a head section with a tool engagement structure and a shaft section, wherein the at least one nose projects from the shaft section, the first bearing ring and the second bearing ring are arranged around the shaft section.

17. An assembly, comprising:

a coating robot having a cavity;

a removable cover sealing the cavity;

a fastening apparatus fastening the removable cover to the robot, the fastening apparatus having a rotatable closure element with a rotational closing movement between 45° and 215° into a closure position;

wherein the closure element has a first bearing ring and a second bearing ring between which the removable cover is arranged, wherein at least one of the first and second bearing rings includes a radial slot intersecting a circumferential slot;

the fastening apparatus and the removable cover close the cavity of the robot at least to a pressure of 175 mbar;

the fastening apparatus has a cylindrical closure bushing for receiving and fastening of the closure element in sections;

the closure bushing has at least one slope construction, contained within the cylindrical closure bushing, for at least one nose of the closure element in order to generate a closing stroke of the closure element;

the at least one slope construction has a slope towards a high or turning point, wherein the at least one slope construction has a sub-section with a reduced or negative pitch in the closing rotational direction of the closure element behind the high or turning point; and the at least one slope construction has at least one abrupt discontinuity which is haptically noticeable by an operator during passing of the at least one nose so that the operator is communicated in a haptically noticeable manner of a reaching of the closure position or the progression of a closing process during a rotation of the closure element.

18. The assembly according to claim 17, characterised in that the at least one slope construction has a second discontinuity in the closing rotational direction of the closure element which is haptically noticeable by an operator during passing of the at least one nose.

* * * * *